US010307932B2

(12) United States Patent
Turnbull et al.

(10) Patent No.: US 10,307,932 B2
(45) Date of Patent: Jun. 4, 2019

(54) METHOD FOR THE MODIFICATION OF WOOD

(71) Applicant: Tricoya Technologies Ltd, London (GB)

(72) Inventors: Neil Turnbull, London (GB); Theodorus Gerardus Marinus Maria Kappen, London (GB)

(73) Assignee: Tricoya Technologies Ltd., London (GB)

( * ) Notice: Subject to any disclaimer, the term of this patent is extended or adjusted under 35 U.S.C. 154(b) by 265 days.

(21) Appl. No.: 15/310,342

(22) PCT Filed: May 12, 2015

(86) PCT No.: PCT/EP2015/060449
§ 371 (c)(1),
(2) Date: Nov. 10, 2016

(87) PCT Pub. No.: WO2015/173226
PCT Pub. Date: Nov. 19, 2015

(65) Prior Publication Data
US 2017/0173819 A1 Jun. 22, 2017

(30) Foreign Application Priority Data

May 13, 2014 (EP) ..................... 14168076

(51) Int. Cl.
| | | |
|---|---|---|
| *B01J 3/00* | (2006.01) | |
| *B01J 3/02* | (2006.01) | |
| *B27K 3/02* | (2006.01) | |
| *B27K 3/10* | (2006.01) | |
| *B27K 3/34* | (2006.01) | |
| *B27K 5/00* | (2006.01) | |
| *C08H 8/00* | (2010.01) | |

(52) U.S. Cl.
CPC ............... *B27K 3/10* (2013.01); *B01J 3/006* (2013.01); *B01J 3/02* (2013.01); *B27K 3/0214* (2013.01);
(Continued)

(58) Field of Classification Search
CPC ........ B27K 3/02; B27K 3/0207; B27K 3/025; B27K 3/0278; B27K 3/08; B27K 3/10;
(Continued)

(56) References Cited

U.S. PATENT DOCUMENTS 3,094,431 A * 6/1963 Goldstein ................ C08H 8/00
34/404
4,592,962 A * 6/1986 Aoki ..................... B27K 3/0214
427/325
(Continued)

FOREIGN PATENT DOCUMENTS

| EP | 0680810 A1 * | 11/1995 | ............... B27K 1/00 |
|---|---|---|---|
| WO | 2013117642 | 8/2013 | |
| WO | 2013139937 | 9/2013 | |

OTHER PUBLICATIONS

Rowell, Roger M., "Acetylation of Wood: Journey from Analytical Technique to Commercial Reality," Forest Products Journal, vol. 56, No. 9, Sep. 2006, pp. 4-12. (Year: 2006).*

*Primary Examiner* — William P Fletcher, III
(74) *Attorney, Agent, or Firm* — OspreyIP, pllc; James R. Cartiglia

(57) ABSTRACT

Disclosed is a method for the continuous impregnation of wood elements, such as wood chips. The method comprises the subsequent steps of subjecting the wood elements to vacuum, to contact with acetylation fluid, and to impregnation pressure. Preferably, the process is conducted in a plant having conveyors, such as transportation screws, in suitable positions between the zones in which the subsequent process steps are conducted. The impregnation method is used in connection with the acetylation of the wood elements, and preferably is followed by a continuous acetylation process conducted in an acetylation reaction zone downstream of the zone where the impregnation is conducted.

26 Claims, 1 Drawing Sheet

(52) U.S. Cl.
CPC ............ *B27K 3/0221* (2013.01); *B27K 3/346* (2013.01); *B27K 5/0075* (2013.01); *C08H 8/00* (2013.01); *B27K 2200/10* (2013.01); *B27K 2240/50* (2013.01)

(58) Field of Classification Search
CPC ........ B27K 3/36; B27K 5/007; B27K 5/0075; B27K 2240/00
USPC ........... 427/298, 317, 325, 351, 440; 118/50
See application file for complete search history.

(56) References Cited

U.S. PATENT DOCUMENTS

| | | | | |
|---|---|---|---|---|
| 5,072,692 | A * | 12/1991 | Ikeda | B27K 3/08 118/400 |
| 8,173,224 | B2 * | 5/2012 | Nasheri | B27K 3/0271 427/235 |
| 2004/0258941 | A1 * | 12/2004 | Neogi | C08B 3/00 428/537.1 |
| 2007/0056655 | A1 * | 3/2007 | Vinden | B27K 3/0214 144/380 |
| 2007/0128422 | A1 * | 6/2007 | Nasheri | B27K 3/0271 428/292.4 |
| 2011/0045268 | A1 * | 2/2011 | Girotra | B27K 3/346 428/220 |
| 2012/0101620 | A1 * | 4/2012 | Bendiktsen | B27K 3/025 700/109 |
| 2013/0172526 | A1 * | 7/2013 | Carvajal | F27D 3/00 530/202 |
| 2013/0202789 | A1 * | 8/2013 | Cwirko | B27K 3/025 427/212 |
| 2015/0050483 | A1 * | 2/2015 | Pol | B27K 3/08 428/220 |
| 2015/0051386 | A1 * | 2/2015 | Pol | C08H 8/00 530/507 |

* cited by examiner

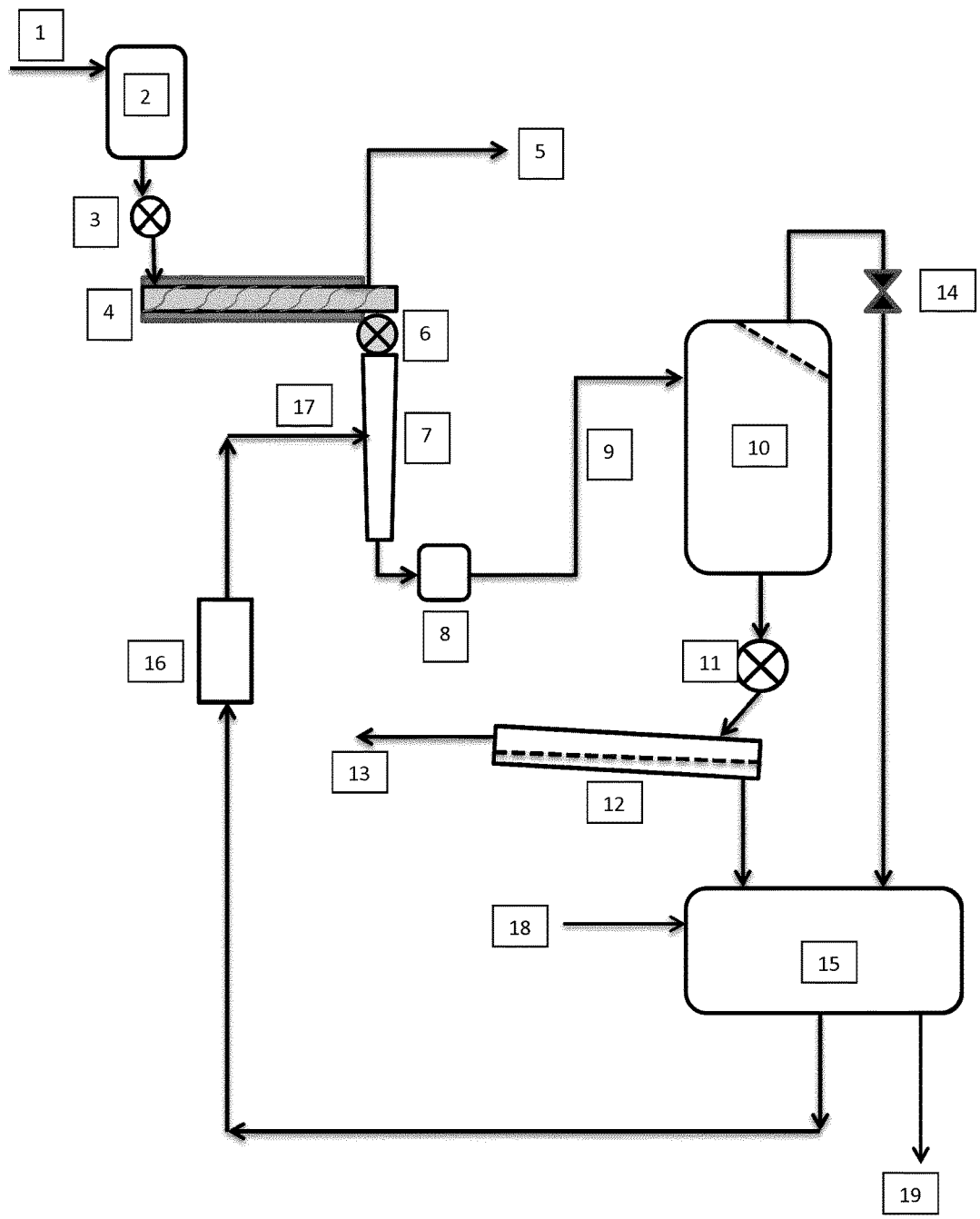

METHOD FOR THE MODIFICATION OF WOOD

FIELD OF THE INVENTION

The invention relates to the chemical modification of a wood based material (lignocellulosic material) by means of acetylation. Particularly, the present invention is in the field of acetylation of wood elements and pertains to a process for the continuous impregnation thereof with acetylation fluid.

BACKGROUND OF THE INVENTION

In order to produce wood-based materials with a long service life, it has been known to chemically modify the wood and in particular to acetylate the wood. Thereby materials with improved material properties, e.g. dimensional stability, hardness, durability, etc., are obtained.

In the art, it is known to use batch processes, i.e. stop/start processes for the acetylation of wood particles. Such processes, however, often lead to poor product uniformity as the properties differ significantly from batch to batch and no two batches can ever be considered as identical.

Some references address the option to conduct wood acetylation in a continuous process. Thus, e.g., EP 757570 discloses a process for the acetylation of lignocellulosic materials (LM) comprising a first step wherein the LM is brought into intimate contact with an acetylating agent comprising acetic anhydride as the major component at a temperature from 80° C. to 140° C. and bringing the acetylated LM from the first step into contact with a heated gas inert under the reaction conditions in a stripper at a temperature above 140° C. A comparable process is described in EP 650 998.

To the extent that these references would enable conducting a continuous process, this is on the basis of a plug screw feeder type of impregnation in series with continuous further processing (e.g. reaction). This is described for wood elements of relatively small dimensions, e.g., fibres, small particles, etc. When used for wood elements of larger dimensions, such as chips or strands, the plug screw will normally lead to a product wherein the wood dimensions have become smaller (crushed chips, crushed strands, broken fibres, smaller particles etc.). Particularly, if chips or strands are used, no plugging effect can be achieved to separate between zones with different pressures and/or atmospheres without destruction/crushing of the chips or strands. It is desired to provide a process for the continuous acetylation of wood particles, and particularly of wood chips or strands, wherein the particles are not damaged in the way as done when using a plug screw feeder.

Moreover, in the acetylation of wood elements, particularly of wood chips, a technical challenge in providing a suitable continuous process, is to combine the advantages of a continuous process, with the desired result of a sufficiently high degree and uniformity of acetylation.

The foregoing is addressed in WO 2013/139937. Therein a process is disclosed that judiciously combines a technique for batch-wise impregnation in such a way that the subsequent acetylation can be conducted in a continuous manner. Accordingly, a plurality of batches of wood elements is impregnated with an acetylation fluid, a plurality of batches of impregnated wood elements is collected in such a manner as to provide a continuous feed of impregnated wood elements to a reactor, as a result of which a continuous flow of impregnated wood elements to acetylation reaction conditions, the output of the process being a continuous flow of acetylated wood elements.

It is notoriously difficult to obtain high acetylation degrees for wood elements. In WO 2013/139937 this is successfully addressed. Without wishing to be bound by theory, the present inventors believe that the impregnation step thereby is key. Thereby the impregnation preferably is conducted as a Bethel type of wood impregnation process. In the Bethel process, the wood is placed in a vacuum chamber and vacuum is applied to draw air from the wood. Active ingredients (in the present invention: an acetylation fluid) is then added to the chamber under vacuum. After filling the chamber with liquid a pressure generally up to 250 pounds per square inch (psi) can be applied, preferably 150 psi to 200 psi. The pressure is removed so that the wood is again subject to atmospheric pressure. This type of process is preferred, since it should normally result in a maximum impregnation load, which is believed to have a direct relation to a desired maximum acetyl level.

In the art, Bethel type impregnation essentially is a batch process. Whilst WO2013/139937 presents an elegant and suitable way of achieving the optimal impregnation batchwise, and combine this with continuous acetylation, it would be desired to provide the possibility of a continuous impregnation of the Bethel type.

The present invention aims to provide a continuous process for the impregnation of wood elements with acetylation fluid, thereby securing the concomitant advantages of consistency in quality (such as acetyl levels, and preferably also residual acetic acid and residual acetic anhydride level) and cost over existing batch processes. Particularly, the invention also aims to provide a continuous impregnation and acetylation process that enables the production of all wood elements having a relatively high degree of acetylation.

SUMMARY OF THE INVENTION

In order to better address one or more of the foregoing desires, the invention presents, in one aspect, a process for the impregnation of wood elements with acetylation fluid, comprising the following steps:

(a) providing wood elements to a vacuum chamber;

(b) subjecting the wood elements to vacuum in said vacuum chamber so as to provide vacuum-treated wood elements;

(c) transferring the vacuum-treated wood elements, under vacuum, to a contacting chamber downstream of the vacuum chamber;

(d) contacting the wood elements, in said contacting chamber, with acetylation fluid, so as to provide a wood acetylation slurry comprising wood elements and acetylation fluid;

(e) discharging the wood acetylation slurry from the contacting chamber;

(f) subjecting the discharged wood acetylation slurry to pressure;

(g) subjecting the slurry to liquid-from-solid separation so as to obtain impregnated wood elements.

In another aspect, the invention provides a process for the acetylation of wood elements comprising the steps (a) to (g) recited above, and (h) subjecting the impregnated wood elements to acetylation reaction conditions so as to obtain acetylated wood elements.

In another aspect, the invention relates to a continuous process for the impregnation of wood elements with acetylation fluid, comprising the following steps:

(a) providing wood elements to a vacuum screw dryer (b) subjecting the wood elements to vacuum in said vacuum screw dryer so as to provide vacuum-treated wood elements;

(c) transporting the wood elements, under vacuum, to a flow line, preferably via a rotary valve, connected to a contacting chamber downstream of the vacuum screw dryer, said contacting chamber being provided with a continuous feed of acetylation fluid;

(d) contacting the wood elements, in said contacting chamber, with acetylation fluid, so as to provide a wood acetylation slurry comprising wood elements and acetylation fluid;

(e) discharging the wood acetylation slurry from the contacting chamber into a flow line connected to an inlet of impregnation chamber downstream of the contacting chamber, said impregnation chamber having at least one outlet to a depressurized zone having a pressure lower than that in the impregnation chamber;

(f) subjecting the discharged wood acetylation slurry to pressure in said flow line and in said impregnation chamber so as to provide an impregnated wood elements slurry;

(g) releasing the impregnated wood elements slurry into said depressurized zone, said zone comprising a fluid draining screw feeder so as to subject the impregnated wood elements slurry to liquid-from-solid separation, and to transfer impregnated wood elements to an outlet of said feeder, at which outlet the impregnated wood elements are obtained.

In a further aspect, the invention provides a plant for the acetylation of wood elements, said plant comprising an impregnation section and, downstream of the impregnation section, an acetylation reaction section, wherein the impregnation section comprises a wood elements conveying device provided with a vacuum connection, said conveying device having an outlet to a contacting chamber, said contacting chamber provided with an inlet for acetylation fluid and an outlet to a pressure zone, said pressure zone having an outlet to a solid-liquid separation device, said solid-liquid separation device having a solid outlet to an inlet of the reaction section.

BRIEF DESCRIPTION OF THE DRAWING

FIG. 1 presents a schematic representation of an embodiment of a plant according to the invention, with an indication of an embodiment of a process conducted therein.

DETAILED DESCRIPTION OF THE INVENTION

The invention presents an important achievement in wood acetylation, in that it provides an impregnation method that allows conducting the desired optimal type of impregnation, viz. Bethel type impregnation, in a continuous manner. In a general sense, the invention is based on the judicious insight to physically separate the step of filling the vacuum-treated wood with acetylation fluid, from the step wherein the resulting filled wood is pressurized.

In the impregnation process of the invention, the latter is secured with reference to the provision of a wood acetylation slurry comprising wood elements and acetylation fluid. This wood acetylation slurry (i.e., in fact a wood acetylation intermediate) is produced under the influence of a vacuum. In the classical Bethel-type impregnation process, the subsequent step of enhancing the pressure so as to complete the impregnation, is conducted just as further step in the same vessel as wherein the filling occurred, and without specifically producing, as an intermediate, a wood acetylation slurry comprising wood elements and acetylation fluid. In the impregnation process of the invention, said wood acetylation slurry is discharged from the contacting chamber prior to pressure enhancement.

The foregoing serves to allow the steps wherein the filling and impregnation of vacuum-treated wood elements, can be conducted in a continuous manner. It is preferred to provide a fully continuous impregnation process, by allowing also the preceding step of subjecting the wood elements to vacuum, to be conducted continuously. To this end, it is preferred that the vacuum chamber is a conveying device having a vacuum connection. This feature of the invention has become possible by virtue of the judicious insight to physically separate the step of subjecting the wood elements to vacuum from the step to fill the vacuum-treated wood elements with acetylation fluid.

Thus, by preference, the process of the invention is conducted so as to separate the step of subjecting the wood elements to vacuum from the step to fill the vacuum-treated wood elements with acetylation fluid, and to separate the step of filling the vacuum-treated wood with acetylation fluid, from the step wherein the resulting filled wood is pressurized.

In the impregnation process of the invention, after providing wood elements to a vacuum chamber, preferably a conveying device having a vacuum connection, a more limited number of different operations is conducted in said chamber than conventionally in the art, viz. only subjecting the vacuum chamber containing the wood elements to vacuum, and further transferring the wood elements.

This limitation of the steps conducted in the vacuum chamber presents advantageous further options for process design. Particularly, the wood elements can be further treated, i.e. filled with acetylation fluid, without hampering the continued filling operation in the vacuum chamber. Even without a conveyor being applied as the vacuum chamber, this presents an advantage of process economy. Particularly, this way the subsequent filling and pressurizing steps can be conducted, even if not necessarily continuous, in a less interrupted manner, as the filling and pressurizing steps do not take up time and capacity of the vacuum chamber.

At the point where the wood elements are provided to the vacuum chamber, it is preferred to provide a pressure sealing device, such as a lock chamber, having an inlet via which wood elements are supplied, and an outlet connected to an inlet of the vacuum chamber. This lock chamber preferably is a moving lock chamber, and most preferably a rotary valve. This facilitates maintaining the vacuum in the vacuum chamber. With a view to a most optimally continuous operation of the vacuum chamber, it is preferred that the vacuum chamber is a conveying device having a vacuum connection, and the lock chamber connected to the inlet of the conveying device is a rotary valve.

The conveying device, which has a substantially airtight housing so as to facilitate maintenance of reduced pressure therein, comprises a system by which wood elements can be transported from an inlet of the device to an outlet thereof. This system can comprise, e.g., a moving belt. Preferably, said system comprises a transportation screw. A particularly suitable apparatus is a vacuum screw dryer, preferably a jacketed vacuum screw dryer. Both single and multiple screw conveyors can be used.

The separation, according to the invention, of a vacuum-treating step and a filling step, makes it possible to conduct the filling of the vacuum-treated wood elements in a chamber that has a continuous supply of acetylation fluid. The vacuum-treated wood elements are transferred from the vacuum chamber, preferably transported through the vacuum chamber by a screw, to the contacting chamber.

Preferably, this transfer runs via a lock chamber downstream of the vacuum chamber. An inlet of said lock chamber is connected, directly or indirectly, to an outlet of the vacuum chamber, and an outlet of the lock chamber is connected, directly or indirectly, to an inlet of the contacting chamber. This lock chamber serves to reduce, and preferably minimize, suction of liquid from the contacting chamber into the vacuum chamber. In a preferred embodiment, the lock chamber is provided with a moving lock, with a preferred lock chamber of this type being a rotary valve. In a more preferred embodiment, the contacting chamber is placed on a lower level than the vacuum chamber, with a connection of sufficient length provided in between (or between the rotary valve, if present, and the contacting chamber) so as to ensure that the amount of liquid (acetylation fluid) present in said connection, matches at least the suction force resulting from the pressure difference between the vacuum chamber and the contacting chamber. Accordingly, in an interesting embodiment of the process of the invention as described hereinbefore, a column of liquid between the vacuum chamber and the contacting chamber counteracts backflow of liquid from the contacting chamber into the vacuum chamber. As indicated, the contacting chamber thereby is preferably placed on a vertically lower level than the vacuum chamber.

Further, the process of the invention avoids pressurizing acetylation fluid-filled wood elements in the same vessel as wherein the vacuum-treated wood elements are filled with acetylation fluid. In order to achieve this, the wood acetylation slurry is discharged from the contacting chamber prior to being subjected to pressure. The positions of the contacting chamber and the pressurization device is such that a sufficient height of acetylation fluid can be maintained above the outlet of the contacting chamber to ensure that the pressure of the fluid at the inlet to the pressurisation device is sufficient to allow it to transfer the slurry. It is advantageous to have a vapour headspace above the necessary liquid level through which the wood elements fall by gravity into the flowing acetylation fluid The pressure is preferably applied to the wood acetylation slurry by means of a pressure pump positioned at an upstream side of a flow line running, directly or indirectly, from the contacting chamber to a downstream treatment section. The impregnation will become completed during the residence of the wood acetylation slurry in an environment under pressure. This environment can just be a flow line of sufficient length. In that case, the next treatment section could be a solid-liquid separation section. Preferably, however, to allow optimizing the residence time of the wood acetylation slurry in a pressurized environment, to have a sufficiently long residence time while under pressure, said downstream treatment section is an impregnation chamber. Design options, which will be clear to the skilled person, are to adapt the length of the flow line to the size of the impregnation chamber, or vice versa. E.g., one can achieve similar residence times by employing a relatively large impregnation chamber, preceded by a relatively short flow line, or by a relatively lengthy flow line, followed by a relatively small impregnation chamber. However, design for the flow line sizing requires to ensure that a sufficient flow velocity is utilized to prevent settling of the wood elements in the line. A person of skill in the art would ensure design of the transfer system avoided such issues.

An impregnation chamber is a vessel, or an otherwise suitable container to hold wood elements and bring these into contact with an acetylation fluid. In the present invention, the impregnation chamber can be closed off from the surrounding atmosphere, and be operated under increased pressure. In general, the impregnation chamber will be a vessel having a separate inlet and at least one outlet, suitable for filling the vessel with a slurry (viz. comprising wood elements and acetylation fluid) and discharging, preferably via a first outlet, a wood slurry (after a certain residence time) from the vessel and via a second outlet allowing recycle of a portion of the acetylation fluid used in the transfer step. Typically, the inlet will be at a higher level, preferably at or near the top of the vessel, than the first outlet, which preferably is at or near the bottom of the vessel. The second outlet would be at the top of the vessel located higher than the inlet. The vessel will have an internal screen or separating element to prevent wood elements passing into the second outlet. The acetylation fluid leaving second outlet is subjected to pressure control and is used to maintain the pressure in the vessel. As a result, the wood elements will be held in a more concentrated slurry in the vessel and will flow through the vessel during a period of time in conformity with the desired residence time. The wood slurry concentrations entering and leaving the vessel may be different from one another to allow optimum operation of the transfer line and residence time of the wood elements in the vessel itself.

Preferably the wood acetylation slurry is subjected to pressure so at to have a residence time under pressure of at least 3 minutes, preferably at least 10 minutes to allow additional swelling to occur. The pressure is generally at least to 2 bar and up to 20 bar, preferably up to 15 bar, more preferably up to 10 bar. A preferred range is 4-6 bar.

Upon or after controlled release from its pressurized environment, via the first outlet, the wood acetylation slurry is subjected to liquid-from-solid separation. Thereby, the remaining free acetylation fluid is removed from the wood elements, so as to allow obtaining impregnated wood elements. Liquid-solid separation can be achieved by various methods known to the skilled person, e.g. by filtration or screening.

It is possible to discharge material (impregnated wood elements and acetylation fluid) from the pressurized environment, e.g. from an impregnation chamber, in batchwise method. Provided that the impregnation chamber is large enough, a batchwise discharge would not necessarily jeopardize a preceding continuous impregnation. However, it would be preferred to ensure that all of the wood elements largely have the same residence time under pressure, so as to obtain a homogeneous degree of impregnation for the wood elements. To this end, it is preferred to arrange a continuous discharge of the materials from the impregnation chamber. This can be conveniently realized, e.g., by using a continuous discharge device such as a pump or other rotary device over which to reduce the pressure of the slurry between the impregnation vessel and a further liquid-solid separator such as a transfer conveyor. Preferably, a fluid draining transfer feeder is used, typically comprising a screw and a draining device such as a perforated screen or a wedge wire screen. This apparatus has a perforated screen allowing free fluid to be drained from the impregnated wood elements, and a conveyer, preferably a screw, to continuously transport the wood elements passing in slurry form from the impregnation chamber to downstream treatment. Both single and multiple screw feeders can be used.

In a preferred embodiment, the aforementioned judicious separation of the filling and pressurizing steps is executed in such a way as to present a fully continuous impregnation process of the Bethel type. Due to the essence of this type of impregnation, viz. involving both vacuum and pressure steps, this presents a particular challenge and has, as of yet, been unheard of in the art.

To this end, a set of preferred technical measures is combined in an advantageous way. This results in a process for the continuous impregnation of wood elements with acetylation fluid, the method comprising the following steps:

(a) providing wood elements to a vacuum screw dryer (b) subjecting the wood elements to vacuum in said vacuum screw dryer so as to provide vacuum-treated wood elements;

(c) transporting the wood elements, under vacuum, to a flow line, preferably via a rotary valve, connected to a contacting chamber downstream of the vacuum screw dryer, and positioned at a lower level than the vacuum screw dryer, said contacting chamber being provided with a continuous feed of acetylation fluid;

(d) contacting the wood elements, in said contacting chamber, with acetylation fluid, so as to provide a wood acetylation slurry comprising wood elements and acetylation fluid;

(e) discharging the wood acetylation slurry from the contacting chamber into a pressurized flow line connected to an inlet of impregnation chamber downstream of the contacting chamber, said impregnation chamber having at least one outlet to a depressurized zone having a pressure lower than that in the impregnation chamber;

(f) subjecting the discharged wood acetylation slurry to pressure in said flow line and in said impregnation chamber so as to provide an impregnated wood elements slurry;

(g) releasing the impregnated wood elements slurry into said depressurized zone, said zone comprising a fluid draining screw feeder so as to subject the impregnated wood elements slurry to liquid-from-solid separation, and to transfer impregnated wood elements to an outlet of said feeder, at which outlet the impregnated wood elements are obtained.

In any of the foregoing embodiments of the impregnation process of the invention, the wood acetylation slurry will ultimately become pressurized in the pressure chamber, so as to complete the impregnation. The impregnated wood elements thus obtained can be retrieved from the pressure chamber, and subjected to acetylation conditions in an acetylation reaction zone, typically a reaction chamber or vessel.

Thus, the invention also pertains to a process for the acetylation of wood elements comprising the steps of the impregnation process as described above, followed by (h) subjecting the impregnated wood elements to acetylation reaction conditions so as to obtain acetylated wood elements.

A reaction chamber is a vessel, a reactor, or otherwise any device suitable to subject wood elements, impregnated with acetylation fluid, to reaction conditions that bring about acetylation of the wood. In the invention the reaction chamber, as opposed to reaction chambers used in batch acetylation processes, is preferably operated as continuous reactor. In an interesting embodiment, the reaction chamber is operated with two or more zones wherein different temperatures are applied. This is a suitable measure to optimize the application of heat to the wood elements in the course of the acetylation reaction. Preferably two to five zones are applied. The skilled person will be able to determine the desired heating regimen, i.e. the number of zones, the temperatures applied therein, and the effective residence time in each of these zones. It will be understood that the precise optimization depends on circumstances such as the type and shape of wood to be acetylated and the specific apparatus chosen for acetylation.

Suitable reactors include, but are not limited to, liquid or gas-phase reactors known in the art of wood acetylation. A gas-phase reactor is preferred. This type of reactor allows subjecting the impregnated wood elements at higher temperatures, whilst at relatively low pressures. As a result, the residence time in a gas-phase type reactor can generally be longer than in e a liquid-type reactor, which is beneficial to the acetylation levels. Also, in a gas-phase reactor the wood elements are not prone to washing out of acetic acid. In case of a liquid-phase reactor (i.e., without separating of excess liquid from the impregnated particles) washing out of this acetic acid would result in lowering the acetic anhydride concentration in the surrounding acetylation fluid Also resins, as a desirable component of wood, are better retained in a gas-phase type reactor than in a liquid type reactor.

In order to be suitable for continuous operation, the reaction chamber is designed in such a way as to allow the input of impregnated wood elements, and the output of acetylated wood elements, to be continuous. This can be realised in various ways, controlled by gravitation, by mechanical forces, or both. Preferably, the wood elements are carried through following the principle of plug flow, which implies a "first-in-first-out" principle.

The reaction chamber may comprise a vertically arranged plug flow reactor through which the wood elements pass downwardly through an acetylation fluid. An example of simple gravitational flow is a reaction chamber that is tilted in the sense that the inlet is positioned higher than the outlet. As a result thereof, wood elements will flow, by gravitation, from the inlet to the outlet, whilst being subjected to acetylation conditions. An example of mechanical force is a reaction chamber comprising a screw conveyor serving to transport wood elements from the inlet to the outlet. In one embodiment, the transportation forces will be provided by a combination of mechanical forces exerted by a screw and gravitational forces provided by having an inlet at higher level than an outlet. Most preferably, a screw conveyor is employed having a substantially horizontal screw, as a result of which the transportation is fully controlled by the mechanically operated screw, and not affected by gravitation. Both single and multiple screw conveyors can be used.

Without wishing to be bound by theory, the inventors believe that the aforementioned type of impregnation process of the invention, viz. involving a vacuum before filling wood elements with acetylation fluid and involving pressure so as to optimize the actual impregnation, is key to obtaining a high degree of acetylation. Thus, the present invention meets a technical challenge in the acetylation of wood elements, particularly of wood chips, viz. that of combining the advantages of a continuous process, with the desired result of a sufficiently high degree and uniformity of acetylation.

It should be noted that in determining wood acetylation degrees, two different approaches exist in the field. One is based on WPG (Weight Percentage Gain). WPG compares a sample before and after acetylation treatment, and as a result any substances added (and any residues still present in the wood) increase the value. WPG is explained in the following formula: WPG=($M_{increase}/M_{sample\ before\ reaction}$)× 100%. Herein M stands for mass, and $M_{increase}$= $M_{sample\ after\ reaction}-M_{sample\ before\ reaction}$).

The other approach, is to actually measure the acetyl content (AC). This is given as AC=($M_{acetyls}/M_{sample\ after\ reaction}$)×100%. Typically HPLC (high-pressure liquid chromatography) can be used to quantify the acetate ion concentrations resulting from the saponification of acetyl groups from the wood. From this the overall mass of the acetyl groups after acetylation can be taken as $M_{acetyls}$.

The different results for WPG and AC can be explained with reference to the following theoretical example: a sample of, e.g., 1 g of wood is acetylated and after the reaction has a mass of 1.25 g. Thus $M_{acetyls}$ is 0.25 g. The resulting WPG is: (1.25−1.00)/1.00*100%=25%. Calculated as acetyl content, AC is =(1.25−1.00)/1.25*100%=20%.

Hence, care should be taken not to directly compare degrees of acetylation expressed in WPG with degrees of acetylation expressed in AC. In the present description AC values are elected to identify the degree of acetylation.

The wood elements to be impregnated by the process of the invention can be, e.g., wood chips, wood strands, wood particles. The process and plant of the invention can be used for the impregnation, and acetylation, of durable and non-durable hardwoods, as well as durable and non-durable softwoods. The wood elements preferably belong to non-durable wood species such as soft woods, for example, coniferous trees, typically spruce, pine or fir, or to non-durable hardwoods. Preferred types of wood are spruce, sitka spruce, maritime pine, scots pine, radiata pine, lodgepole pine, eucalyptus, red alder, European alder, beech and birch.

Typical dimensions of wood elements as defined in accordance with the present invention are given in the following table.

TABLE

| wood element | length (mm) from | to | width (mm) from | to | thickness (mm) from | to |
|---|---|---|---|---|---|---|
| Chips | 5 | 75 | 5 | 50 | 1.5 | 25 |
| Strands | 20 | 120 | 5 | 40 | 0.25 | 1.5 |
| splinters (slivers) | 5 | 75 | 0.15 | 0.5 | 0.15 | 0.5 |
| Particles | 1.5 | 20 | 0.15 | 5 | 0.15 | 5 |
| Fibre bundles | 1.5 | 25 | 0.15 | 0.5 | 0.15 | 0.5 |
| Fibres | 1 | 5 | 0.05 | 0.1 | 0.05 | 0.1 |

The benefits of the process of the invention are exhibited to the greatest extent in the event of wood chips, strands, or particles. Most preferably, the wood elements are wood chips.

Wood elements of a narrow size distribution are preferred to facilitate a homogeneous mass flow. A preferred size distribution is characterized by a length of 10-40 mm, a width of 8-32 mm, and a thickness of 2-16 mm.

Before impregnation, preferably, wood elements with a moisture content of less than 15% by weight are provided. This can be achieved by pre-drying wood elements having a higher moisture content. The pre-drying can be done in a continuous or batch process by any method known in the wood industry. Preferably, the moisture content of the wood elements is less than 8%, more preferably in a range of from 0.01% to 5%, still more preferably in a range of from 0.5% to 4%.

In a preferred embodiment, pre-heated wood elements, typically of a temperature between 60° C. and 100° C., preferably 70° C. to 90° C., more preferably 75° C. to 85° C., are provided to the vacuum chamber. Apart from pre-heating, or in addition to pre-heating, in an interesting embodiment the wood elements are heated in the course of the impregnation process, in one or more of the stages thereof.

During impregnation the elements are contacted with the acetylation fluid allowing sufficient uptake of the fluid by the wood elements for subsequent acetylation. The acetylation fluid preferably comprises acetic anhydride and/or acetic acid, and preferably a mixture of acetic anhydride and acetic acid. In a preferred embodiment, the acetylation fluid contains 40-100 wt. % acetic anhydride and 0-60 wt. % acetic acid. Within this range a mixture of 75-95 wt. % acetic anhydride and 5-25 wt. % acetic acid has been found to be beneficial.

A preferred temperature range during impregnation is from 20° C. to 180° C. The elements to fluid ratio is preferably at least 1 to 4. In the case of an anhydride/acid mixture having an excess of anhydride, a preferred temperature is 60° C. to 110° C.

In the reaction chamber, the impregnated wood elements are acetylated in a reactor for continuous acetylation, according to the "first in first out" principle. The residence time of the wood elements in the acetylation reactor can be controlled in order to attain the desired modification level of the elements, e.g. acetylation degree. The required residence time may also depend on the acetylation temperature. The acetylation temperature is 100-200° C., and preferably 135-180° C. Preferably, the acetylation step is conducted during 1 to 300 minutes, more preferably 30-180 minutes.

The acetylation in this process is preferably performed at temperatures higher than the atmospheric boiling point of the acetylation fluid. These higher temperatures significantly speed up the acetylation process. Therefore, acetylation temperatures in this continuous process are preferably in the range of 135° C.-180° C., The ratio of evaporation to reaction can be adjusted by the pressure level in the reaction chamber. A higher pressure at a certain reaction temperature means a lower evaporation rate at essentially the same reaction rate. Preferably the pressure inside the reaction chamber is maintained between −0.40 barg and 3 barg and more preferably between −0.2 barg and 1 barg and still more preferable between −0.1 and 0.5 barg.

In one embodiment the "first in first out" principle is fulfilled by using a screw conveyor filled with impregnated and separated from excess liquid wood elements. Due to the gentle rotation of the screw, preferably in a horizontal position, the wood elements are prevented from attrition. This results in good element quality during the process. In one embodiment the reactor contains a double, parallel screw conveyor in order to increase the effective volume of the reactor.

The temperature during the acetylation can be controlled by a heated gas loop, which contains a gas at least partially saturated with acetic anhydride and/or acetic acid or being superheated acetic acid and/or acetic anhydride. An inert gas means that it does not participate in the acetylation reaction and is preferably nitrogen, carbon dioxide, or flue gas. In another embodiment, the screw conveyor reactor comprises a screw axle and a conveyor casing and the temperature of the acetylation is controlled by heating the screw axle and/or the conveyor casing. In this embodiment, the impregnated wood elements are directly heated by the screw axle and/or the conveyor casing. This heating can be performed by steam, oil or electrically. In another embodiment the heating can be done by a combination of a heated gas loop, heating by the screw axle and by the conveyor casing.

After acetylation, the acetylated wood elements can be dried, e.g. in a conventional manner, or as described in WO 2013/139937.

Acetylated wood elements according to the present invention may usefully be refined and converted to board, such as medium density fibreboard, MDF, or oriented strand board, OSB, or particle board, which will possess the superior dimensional stability, durability, stability to ultra-violet light and thermal conductivity, compared with board derived from non-acetylated wood elements.

In another aspect, the invention provides a plant for the acetylation of wood elements, said plant comprising an impregnation section and, downstream of the impregnation section, an acetylation reaction section, wherein the impregnation section comprises a wood elements conveying device provided with a vacuum connection, said conveying device having an outlet to a contacting chamber, said contacting chamber provided with an inlet for acetylation fluid and an outlet to a pressure zone, said pressure zone having an outlet to a solid-liquid separation device, said solid-liquid separation device having a solid outlet to an inlet of the reaction section.

Preferably, the conveying device is a vacuum screw dryer. This can be a single screw dryer or a multiple screw dryer. In a further preferred embodiment, the plant comprises a wood elements supply chamber upstream of the impregnation section. The supply chamber can be a vessel or other container suitable for holding a volume of wood elements, optionally hot wood elements, and having an outlet in fluid communication with an inlet of the vacuum chamber. Preferably, the connection between said outlet and inlet comprises a lock chamber in view of the vacuum to be retained in the vacuum chamber. With a view to a preferred continuous discharge of wood elements from the supply chamber into the vacuum chamber, said lock chamber is preferably a moving lock chamber, more preferably a rotary valve.

In the plant of the invention, the vacuum chamber is preferably positioned at a higher level than the contacting chamber, with a flow line (preferably a standpipe) running from an outlet of the vacuum chamber to an inlet of the contacting chamber. More preferably, this flow line is provided with a lock chamber, most preferably a rotary valve.

The contacting chamber is provided with a supply line for acetylation fluid. Preferably, this supply line is contained in a recirculation loop, wherein excess acetylation fluid is retrieved downstream of the impregnation zone, and fed to said recirculation loop, wherein the composition is adjusted, by the judicious purge of a portion of the mixture and by addition of fresh anhydride to give the desired acetylation mixture.

The pressure zone comprises a flow line and an impregnation chamber, said zone connected to a pressure pump, with the flow line, typically a pressurized pipeline, running from an outlet of the contacting chamber to an inlet of the impregnation chamber. The pressure pump is preferably a lobe pump. or other solids handling pumps.

The impregnation chamber comprises an inlet connected to the aforementioned pressurized flow line, and an outlet for the wood elements connected, directly or indirectly, to an inlet of a liquid-solid separator, said separator comprising a draining device such as a perforated screen, and a transportation screw (which can be a single screw or a multiple screw) allowing solids to be transported from said inlet to an outlet for solids, which solid outlet is connected, directly or indirectly, to an inlet of an acetylation reaction section, particularly a reaction vessel. It will be understood that the reaction section has at least one outlet so as to allow collecting acetylated wood elements.

Preferably, the line connecting the first outlet of the impregnation chamber to the inlet of the liquid-solid separator, is provided with a pressure pump allowing running in reverse, so as to provide the zone downstream of said pressure pump with a pressure that is reduced as compared to the pressure in the impregnation chamber. Preferably, a portion of the transfer acetylation fluid is separated from the wood elements in the impregnation chamber and is passed via the second outlet to a pressure retaining valve. When operating the plant, and particularly when conducting an impregnation or acetylation process of the invention as described hereinbefore, the pressure in the impregnation chamber, and/or in the pressurized flow line running from the contacting chamber to the impregnation chamber, is 2 to 20 bar, preferably up to 15 bar, more preferably up to 10 bar. In an interesting embodiment, said pressure is 4-6 bar. Typically, the reduced pressure downstream of the impregnation chamber is 1 to 8 bar, more preferably 1-5 bar, and most preferably 1 to 3 bar.

In summary, the invention includes a method for the continuous impregnation of wood elements, such as wood chips. The method involves subjecting the wood elements to vacuum, to filling with acetylation fluid, and to impregnation pressure, in separate process steps. Preferably, the process is conducted in a plant having conveyors, such as transportation screws, in suitable positions between the zones in which the separate process steps are conducted. The impregnation method is used in connection with the acetylation of the wood elements, and preferably is followed by a continuous acetylation process conducted in an acetylation reaction zone downstream of the zone where the impregnation is conducted.

An embodiment of the invention is illustrated in FIG. 1. Therein the reference signs, which are not limiting the invention, have the following meaning:

1—Wood elements
2—Wood elements storage hopper
3—Lock Chamber (rotary)
4—Vacuum screw dryer
5—Vacuum connection
6—Lock Chamber (rotary)
7—Contacting chamber
8—Slurry Pressuring device
9—Slurry transfer flowline
10—Impregnation chamber
11—Slurry De-pressurisation device
12—Perforated screen transfer feeder
13—Impregnated wood elements
14—Pressure retaining valve
15—Acetylation fluid reservoir
16—Acetylation fluid heater
17—Heated Acetylation fluid
18—Fresh anhydride
19—Acetylation fluid purge In the embodiment of the drawing, an impregnation and acetylation process is conducted as follows. Wood elements (1) are provided to a storage hopper (2) to a vacuum screw dryer (4) via a lock chamber, e.g., a rotary valve (3). The vacuum screw dryer (4) has a vacuum connection (5).

The wood chips, evacuated in the vacuum screw dryer (4), are transferred via a lock chamber, e.g. a rotary valve (6) to a contact chamber (7). The contact chamber (7) is provided with an inlet for heated acetylation fluid (stream 17), and with an outlet to a slurry pressuring device (8) where the slurry of wood elements and acetylation fluid discharged from the contact chamber (7) is subjected to pressure, and transferred via a slurry flow line (9) to an impregnation chamber (10).

To accommodate for operation where the wood solids concentration in the stream leaving the impregnation chamber (10) to the lock chamber (11) is higher than the wood solids concentration in slurry transfer line (9) and where the residence time in impregnation chamber 10 is constant, excess liquid is removed via a pressure retaining valve (14) placed in the liquid line between (10) and (15) acting as a means of control of the desired impregnation pressure.

The slurry, after impregnation, is discharged from the impregnation chamber (10), via a lock chamber, e.g. a rotary valve (11), to a perforated screen transfer feeder (12), where liquid and solids become separated. The liquid (acetylation fluid) is drained to an acetylation fluid reservoir (15), from which acetylation fluid is transferred via a heater (16) to the contacting chamber via a heated acetylation fluid flow line (17). From the perforated screen transfer feeder a flow (13) impregnated wood elements is obtained. In order to control the right composition of the acetylation liquid used for this impregnation fresh anhydride is added to the acetylation fluid reservoir via a flow line (18), and used acetylation liquid can be purged via acetylation fluid purge (19).

In sum, the invention pertains to a method for the continuous impregnation of wood elements, such as wood chips. The method comprises the subsequent steps of subjecting the wood elements to vacuum, to contact with acetylation fluid, and to impregnation pressure. Preferably, the process is conducted in a plant having conveyors, such as transportation screws, in suitable positions between the zones in which the subsequent process steps are conducted. The impregnation method is used in connection with the acetylation of the wood elements, and preferably is followed by a continuous acetylation process conducted in an acetylation reaction zone downstream of the zone where the impregnation is conducted.

It is expressly foreseen that the various different embodiments and preferences discussed above, can be combined as the skilled person sees fit.

The invention claimed is:

1. A process for the impregnation of wood elements with acetylation fluid, comprising the following steps:
   (a) providing wood elements to a vacuum chamber;
   (b) subjecting the wood elements to vacuum in said vacuum chamber so as to provide vacuum-treated wood elements;
   (c) transferring the vacuum-treated wood elements, under vacuum, to a contacting chamber downstream of the vacuum chamber;
   (d) contacting the wood elements, in said contacting chamber, with acetylation fluid, so as to provide a wood acetylation slurry comprising wood elements and acetylation fluid;
   (e) discharging the wood acetylation slurry from the contacting chamber;
   (f) subjecting the discharged wood acetylation slurry to pressure;
   (g) subjecting the slurry to liquid-from-solid separation so as to obtain impregnated wood elements.

2. The process according to claim 1, comprising transporting the wood elements through the vacuum chamber by a conveying device.

3. A process according to claim 2, wherein the conveying device comprises a screw.

4. The process according to claim 1, wherein the wood elements are supplied to the vacuum chamber via a lock chamber.

5. A process according to claim 4, wherein the lock chamber comprises a rotary valve.

6. The process according to claim 1, wherein a column of liquid between the vacuum chamber and the contacting chamber counteracts backflow of liquid from the contacting chamber into the vacuum chamber.

7. The process according to claim 1, wherein the contacting chamber is placed on a vertically lower level than the vacuum chamber.

8. The process according to claim 1, wherein the pressure to which the wood acetylation slurry is subjected is 2-10 bar.

9. The process according to claim 8, wherein the pressure to which the wood acetylation slurry is subjected is 4-6 bar.

10. The process according to claim 1, comprising subjecting the wood acetylation slurry to pressure so as to have a residence time under pressure of at least 3 minutes.

11. The process according to claim 1, comprising continuously discharging impregnated wood elements and acetylation fluid are continuously discharged from the impregnation chamber.

12. A process according to claim 11, wherein the continuous discharging of the impregnated wood elements and acetylation fluid is done by using a fluid draining perforated screen transfer feeder or a wedge wire screen transfer feeder.

13. The process according to claim 1, the process being a continuous process comprising the following steps:
    (a) providing wood elements to a vacuum screw dryer
    (b) subjecting the wood elements to vacuum in said vacuum screw dryer so as to provide vacuum-treated wood elements;
    (c) transporting the wood elements, under vacuum, to a flow line connected to a contacting chamber downstream of the vacuum screw dryer, said contacting chamber being provided with a continuous feed of acetylation fluid;
    (d) contacting the wood elements, in said contacting chamber, with acetylation fluid, so as to provide a wood acetylation slurry comprising wood elements and acetylation fluid;
    (e) discharging the wood acetylation slurry from the contacting chamber into a flow line connected to an inlet of impregnation chamber downstream of the contacting chamber, said impregnation chamber having at least one outlet to a depressurized zone having a pressure lower than that in the impregnation chamber;
    (f) subjecting the discharged wood acetylation slurry to pressure in said flow line and in said impregnation chamber so as to provide an impregnated wood elements slurry;
    (g) releasing the impregnated wood elements slurry into said depressurized zone, said zone comprising a fluid draining screw feeder so as to subject the impregnated wood elements slurry to liquid-from-solid separation, and to transfer impregnated wood elements to an outlet of said feeder, at which outlet the impregnated wood elements are obtained.

14. A process according to claim 13, wherein the flow line is provided with a rotary valve.

15. A process for the acetylation of wood elements comprising impregnating wood elements with acetylation fluid according to the process of claim 1, thereby obtaining impregnated wood elements, and (h) subjecting the impregnated wood elements to acetylation reaction conditions so as to obtain acetylated wood elements.

16. The process according to claim 1, comprising applying heat to either or both of the acetylation fluid and the wood elements before providing the wood elements to the contacting chamber, or at any point during the impregnation process, heat is applied to either or both of the acetylation fluid and the wood elements.

17. A plant for the acetylation of wood elements, said plant comprising an impregnation section and, downstream of the impregnation section, an acetylation reaction section, wherein the impregnation section is a vacuum chamber comprising a wood elements conveying device provided with a vacuum connection, the plant further comprising a contacting chamber, a pressure zone, and a solid-liquid separation device, said conveying device having an outlet to the contacting chamber, said contacting chamber provided with an inlet connected to a supply line for acetylation fluid and an outlet to the pressure zone, said pressure zone having an outlet to the solid-liquid separation device, said solid-liquid separation device having a solid outlet to an inlet of the reaction section.

18. A plant according to claim 17, wherein the conveying device is a vacuum screw dryer.

19. A plant according to claim 17, comprising a supply chamber upstream of the impregnation section, said supply chamber having an outlet in fluid communication with an inlet of the vacuum chamber.

20. A plant according to claim 19, wherein the connection between the outlet and inlet comprises a rotary valve.

21. A plant according to claim 17, wherein the vacuum chamber is positioned at a higher level than the contacting chamber, with a flow line running from an outlet of the vacuum chamber to an inlet of the contacting chamber.

22. A plant according to claim 21, wherein the flow line is provided with a rotary valve.

23. A plant according to claim 17, wherein the supply line for acetylation fluid is contained in a recirculation loop connected, directly or indirectly, to a liquid outlet of the solid-liquid separation device.

24. A plant according to claim 17, wherein the pressure zone comprises a flow line and an impregnation chamber, said zone connected to a pressure pump, and wherein said flow line runs from an outlet of the contacting chamber to an inlet of the impregnation chamber.

25. A plant according to claim 17, wherein the impregnation chamber comprises a second fluid outlet suitably screened to prevent passing of wood elements through the outlet.

26. A plant according to claim 17, wherein the solid-liquid separation device comprises a draining device and a transportation screw.

* * * * *